Jan. 6, 1948.   F. R. HENSEL ET AL   2,433,903
METHOD OF MAKING CLAD METAL BODIES
Filed Dec. 30, 1943
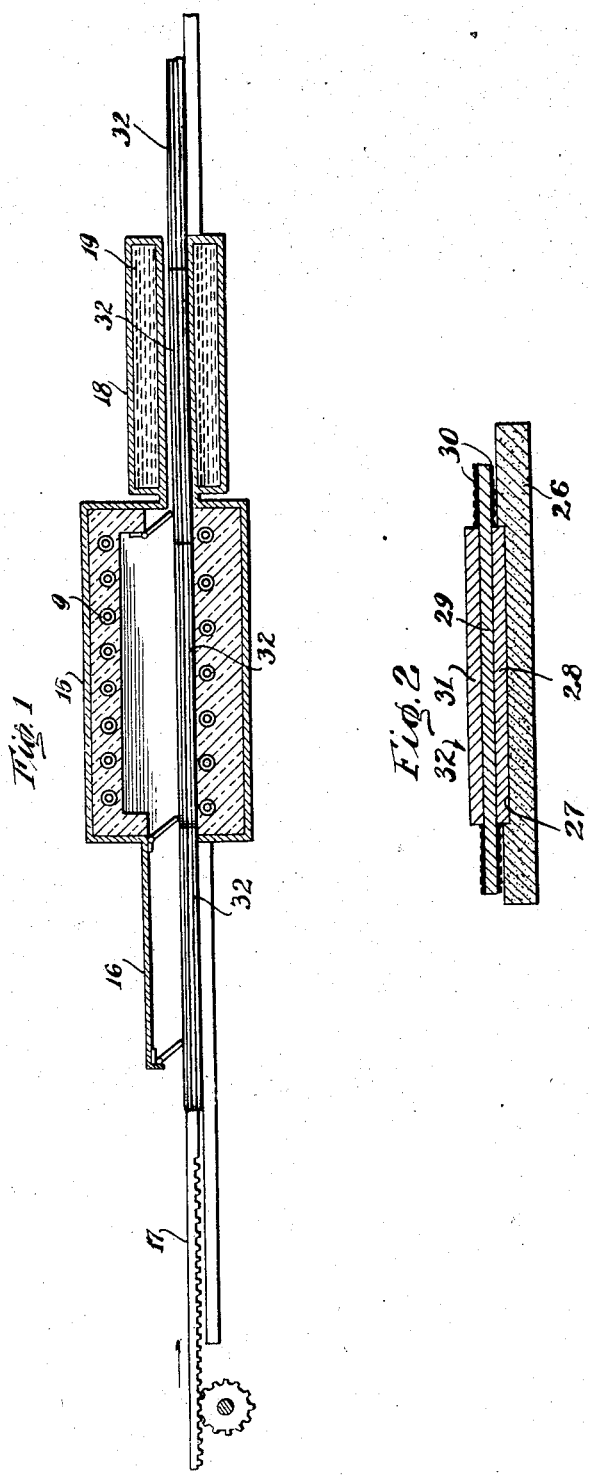
INVENTORS
Franz R. Hensel
BY Earl I. Larsen
ATTORNEYS Patented Jan. 6, 1948

2,433,903

UNITED STATES PATENT OFFICE 2,433,903

METHOD OF MAKING CLAD METAL BODIES

Franz R. Hensel and Earl I. Larsen, Indianapolis, Ind., assignors to P. R. Mallory Co., Inc., Indianapolis, Ind., a corporation of Delaware Application December 30, 1943, Serial No. 516,281

3 Claims. (Cl. 22—204)

This invention relates to a method of cladding a higher melting point metal sheet with a layer of lower melting point metal and, more particularly, to a method of cladding a steel sheet with a layer of silver.

Broadly speaking, the invention contemplates placing a quantity of lower melting point metal, such as silver, in a recess formed in a body of refractory material, the quantity of such lower melting point metal exceeding the amount required to fill the recess. Thereafter, a sheet or body of higher melting point metal, such as steel, is placed over the recess in contact with the lower melting metal and the assembly is passed through a furnace in which the temperature is sufficient to melt the lower melting metal but not the higher melting metal. Thereafter, the assembly is passed into a cooling zone to solidify the lower melting metal in contact with the higher melting sheet. In some embodiments, it is desirable to place an additional quantity of lower melting point metal on top the sheet before the assembly is passed into the cooling zone.

It is an object of the invention to improve the methods of making clad metals.

It is a further object of the invention to provide a sheet of steel clad with silver which is particularly suitable for use as a bearing.

Various other objects, advantages and features of the invention will become apparent from the following detailed description taken in conjunction with the pending drawings, in which:

Figure 1 is a longitudinal section through a furnace and cooler for carrying out the process of the invention; and Figure 2 is a longitudinal section through an assembly preparatory to treatment according to the invention.

Referring now to the drawings in detail, the furnace 15 may be of the electric type having a resistance heating element, 9 and having associated with it a means for producing a neutral or reducing gas atmosphere, such as nitrogen, hydrogen, or cracked gas. Assemblies of steel strips and silver are fed into the furnace through entrance chamber 16 and are slowly shoved through the furnace by automatic stoker rod 17.

The furnace is maintained at a temperature above the melting point of the cladding metal. A suitable furnace temperature for silver cladding is 1100° to 1200° C. or 1050° to 1300° C. The furnace is of sufficient length to melt the silver while the assemblies are passing through it and also to raise the temperature of the steel backing strip above the melting point of silver and preferably to substantially the same temperature as the molten silver at the time the assembly leaves the furnace. A cooler 18 is located adjacent the furnace exit and may comprise a water jacket containing cooling water passages 19 supplied with cold water.

Figure 2 illustrates methods of applying facing layers of lower melting point metals to higher melting point backings. A graphite slab 26 is machined with a shallow recess 27 in one face, the recess being of the dimensions desired for the facing layer to be applied to the backing sheet. A sheet of the facing metal 28 is then laid in the recess 27 and the sheet of backing metal 29 is laid on top of sheet 28. The cladding metal 28, such is silver, is preferably used in a sheet somewhat thicker, for instance 30% thicker, than the depth of recess 27 in the graphite slab so as to insure contact with the backing sheet 29 before and after melting. Where backing sheet 29 is of larger dimensions than the facing to be applied, a coating 30 of adhesion preventing substance, such as kaolin, may be applied as a border.

Where it is desired to coat both surfaces of the backing sheet 29 with a clad metal facing, a further sheet 31 of the facing metal may be laid on the top face of the backing sheet. If this layer is sufficiently thin (not much greater than 0.15 inch) and the furnace is sufficiently free from vibration or jarring, no retaining wall will be necessary to prevent the layer 31 from running off when it is melted. The kaolin border 30 prevents spreading of the molten metal to regions where it is not desired.

The assembly 32 illustrated in Fig. 2 is put through the furnace illustrated in Figure 1, the rate of stoking through the cooling chamber being regulated to produce longitudinal crystallization on both surfaces of the sheet. The use of the graphite slab with the machined recess results in a very uniform smooth surfaced layer. It is also possible to machine the recess in the graphite slab to produce a surface layer of any desired configuration, and varying in thickness.

While the process has been described as applied particularly to the beading of silver onto steel, it is also applicable to the cladding of various other backing metals with various lower melting point facings. Its principal application is to silver and copper and to silver base and copper base alloys. One group of materials where the invention is particularly useful are alloys of silver with lead, thallium or indium, or mixtures of these. For example, an alloy coating of silver with 2% thallium suitable for a bearing, may be applied to a steel backing in this way. Alloys of copper with lead, thallium, tin, zinc, cadmium and other metals may also be used as the cladded materials as well as brass, bronze, leaded bronze, age hardening copper alloys and other copper base and silver base bearing metals. Where alloys are used, and particularly where lead and thallium are present the resulting layer of clad metal may have two or more phases present. It is found that free lead and thallium phases are uniformly distributed throughout the layer and are not collected in large globules. This is of great advantage in bearing materials.

The principal backing metal is steel which may be cleaned and used without other treatment or with a copper flashing or with a copper flashing and a nickel plating as described above. Other suitable backings are Monel metal which is a nickel-copper alloy and also alloys of the iron group metals and other base metals having similar characteristics and having a higher melting point than the cladding metal which is used for the facing.

In addition to bearings the clad metals produced may be used for linings of chemical apparatus, for electric contacts, for thermostat metals and for other purposes where bi-metals are used. In the case of a bearing, it is preferred that the crystal grains shall run parallel to the direction of motion of the bearing surfaces. The longitudinal crystals are less easily disrupted or dislodged by forces acting at the bearing surface and are less subject to seizing and also produce a more uniform and regular surface.

For thermostatic metals the crystal grain should run longitudinal to the bi-metal strip since the metal presents its greatest strength in this direction.

Contacts produced of the clad metal having the grains running parallel to the contact surface have the advantage of a reduced number of grain boundaries at the surface and a less number of surface irregularities.

This application is a continuation-in-part of our co-pending application, Serial No. 449,092, filed June 30, 1942.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. The method of cladding a higher melting point metal sheet with a layer of lower melting point metal which comprises placing a quantity of said lower melting metal in a shallow recess in a slab of refractory material, said quantity exceeding that required to fill said recess, laying said higher melting metal sheet over said recess containing said lower melting metal and passing the assembly through a furnace to melt said lower melting metal and into a cooling one to solidify it in contact with said higher melting sheet.

2. The method of cladding a higher melting point metal sheet with a layer of lower melting point metal which comprises placing a quantity of said lower melting metal in a shallow recess in a slab of refractory material, said quantity exceeding that required to fill said recess, laying said higher melting metal sheet over said recess containing said lower melting metal, placing an additional quantity of lower melting point metal on top of said metal sheet, passing the assembly through a furnace to melt said lower melting metal, and introducing the assembly into a cooling zone to solidify the lower melting point metal in contact with said higher melting sheet.

3. The method of cladding a steel sheet with a layer of silver which comprises placing a quantity of silver in a shallow recess in a slab of refractory material, said quantity exceeding that required to fill said recess, laying said steel sheet over said recess containing the silver, and passing the assembly through a furnace to melt the silver and into a cooling zone to solidify said silver in contact with said steel sheet.

FRANZ R. HENSEL.
EARL I. LARSEN.

REFERENCES CITED

The following references are of record in the file of this patent:

UNITED STATES PATENTS

| Number | Name | Date |
| --- | --- | --- |
| 1,956,462 | Knuth | Apr. 24, 1934 |
| 2,048,733 | Eldred | July 28, 1936 |
| 2,055,980 | Liebmann | Sept. 29, 1936 |
| 2,203,679 | Edwards | June 11, 1940 |
| 927,371 | Monnot | July 6, 1909 |
| 2,174,733 | Chace | Oct. 3, 1939 |
| 1,217,581 | Eldred | Feb. 27, 1917 |
| 1,751,489 | Miller | Mar. 25, 1930 |
| 2,019,599 | Driggs | Nov. 5, 1935 |
| 2,195,613 | Chace | Apr. 2, 1940 |
| 2,220,210 | Chace | Nov. 5, 1940 |
| 1,777,657 | Stay et al. | Oct. 7, 1930 |
| 1,793,672 | Bridgman | Feb. 24, 1931 |
| 1,812,172 | Rohn | June 30, 1931 |
| 2,131,062 | McBride | Sept. 27, 1938 |
| 2,149,076 | Stockbarger | Feb. 28, 1939 |
| 663,748 | Giroux | Dec. 11, 1900 |
| 2,187,348 | Hodson | Jan. 16, 1940 |

Certificate of Correction

Patent No. 2,433,903.  January 6, 1948.

FRANZ R. HENSEL ET AL.

It is hereby certified that error appears in the printed specification of the above numbered patent requiring correction as follows: Column 4, line 5, for the word "one" read *zone*; and that the said Letters Patent should be read with this correction therein that the same may conform to the record of the case in the Patent Office.

Signed and sealed this 9th day of March, A. D. 1948.

[SEAL]

THOMAS F. MURPHY,
*Assistant Commissioner of Patents.*